United States Patent [19]
Virgile

[11] Patent Number: 5,608,726
[45] Date of Patent: Mar. 4, 1997

[54] NETWORK BRIDGE WITH MULTICAST FORWARDING TABLE

[75] Inventor: Kenneth Virgile, Lexington, Mass.

[73] Assignee: Cabletron Systems, Inc., Rochester, N.H.

[21] Appl. No.: 428,403

[22] Filed: Apr. 25, 1995

[51] Int. Cl.$^6$ .................................................. H04L 12/46
[52] U.S. Cl. ............................................................. 370/401
[58] Field of Search .......................... 370/60, 79, 85.13, 370/85.14, 94.1, 94.3

[56] References Cited

U.S. PATENT DOCUMENTS

| | | | |
|---|---|---|---|
| 5,331,637 | 7/1994 | Francis et al. | 370/54 |
| 5,355,375 | 10/1994 | Christensen | 370/85.2 |
| 5,361,256 | 11/1994 | Doeringer et al. | 370/60 |
| 5,396,493 | 3/1995 | Sugiyama | 370/60 |
| 5,400,326 | 3/1995 | Smith | 370/61 |
| 5,428,615 | 6/1995 | Backes et al. | 370/85.13 |
| 5,448,565 | 9/1995 | Chang et al. | 370/85.13 |
| 5,481,540 | 1/1996 | Huang | 370/85.13 |
| 5,517,494 | 5/1996 | Green | 370/60 |

FOREIGN PATENT DOCUMENTS

WO95/01023  5/1995  WIPO .............................. H04L 12/18

OTHER PUBLICATIONS

S. Deering, *Multicast Routing in Internetworks and Extended LANs*, ACM Symposium On Communication Architectures And Protocols, ACM Sigcomm pp. 55–64, Aug. 1988.
Cisco Systems, Inc., I. P. *Multicast Streamlines Delivery of Multicast Applications*, The Packet: Cisco System Use Magazine, vol. 7, No. 1, pp. 7–9 (1995).
Ninth Data Communications Symposium, Sep. 1985, USA, pp. 172–179, D. R. Cheriton Et Al.: "Host groups: a internetworks".

*Primary Examiner*—Russell W. Blum
*Attorney, Agent, or Firm*—Wolf, Greenfield & Sacks, P.C.

[57] ABSTRACT

A system and method are disclosed for routing multicast packets in a subnetwork so as to conserve bandwidth in at least some of the network segments or collision domains of the subnetwork. In particular, multicast packets are only retransmitted in the network segments that are on a path to a host that is a member of the multicast group of hosts to which the multicast packet is destined.

13 Claims, 4 Drawing Sheets

NETWORK BRIDGE WITH MULTICAST FORWARDING TABLE

FIELD OF THE INVENTION

The present invention relates to a hierarchically organized communication networks which transmit messages therein. For instance, the communications network may transmit a bitstream therein organized into packets. The present invention especially relates to the transmission of multicast packets in such a network.

BACKGROUND OF THE INVENTION

Figure 1:
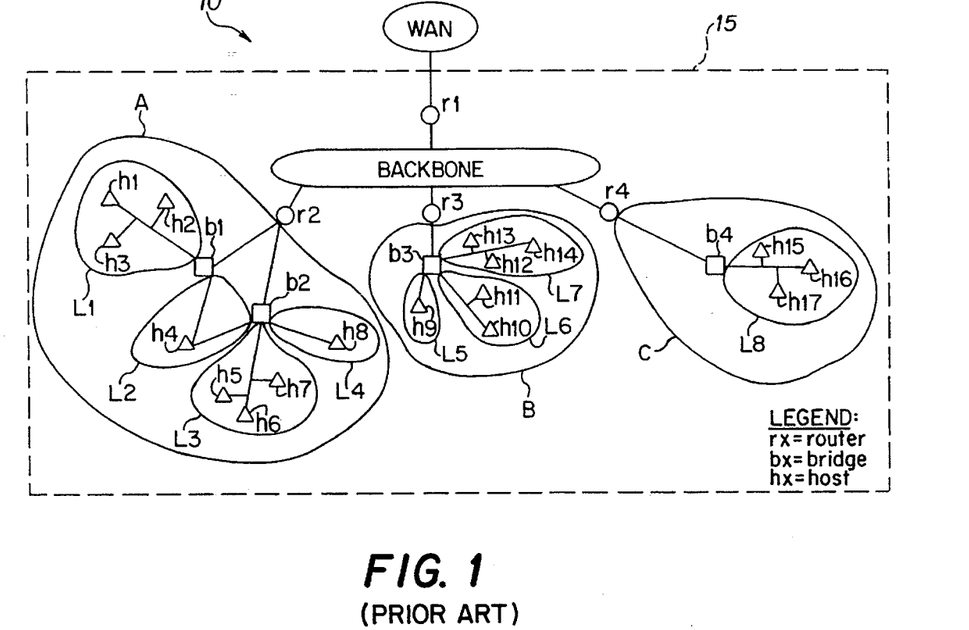
FIG. 1 shows a conventional communications network.

FIG. 1 shows a conventional a hierarchically organized communications network 10. In particular, the communications network has a wide area network (WAN), such as the internet, at the highest level of the hierarchy. A campus network 15 is interconnected to the WAN by a router r1. The campus network 15 is so called because it is typically located at a single geographic campus of several buildings. The interconnections may include any combination of wires, coaxial cables, optical fibers, circuit switches, packet switches, etc. The router r1, interconnects a backbone network of the campus network 15 to the WAN. Connected to the backbone network are additional routers r2, r3 and r4. Each additional router r2, r3 and r4 connects a respective subnetwork A, B or C to the backbone network. The campus network 15 is at a middle level of the hierarchy and subnetworks A,B & C of the campus network 15 are at a lower level in the hierarchy. The subnetworks A,B,C are typically isolated to a single, small geographic area such as an office building or floor of an office building. The WAN, on the other hand, typically sprawls from geographic area to geographic area. The WAN itself typically includes a number of routers (not shown) for routing communications from campus network to campus network.

The communication between routers on the WAN and on the backbone network is illustratively achieved according to the internet protocol (IP). (Herein, protocol means a collection of semantic and syntactic rules obeyed by the devices which communicate according to the protocol.)

The router r2 is connected to bridges b1 and b2 of the subnetwork A, the router r3 is connected to bridge b3 of the subnetwork B and the router r4 is connected to the bridge b4 of the subnetwork C. Each bridge b1–b4 is connected to one or more network segments or collision domains which illustratively are local area networks (LANs). The bridge b1 is connected to network segments L1 and L2, the bridge b2 is connected to network segments L2, L3 and L4, the bridge b3 is connected to network segments L5, L6 and L7 and the bridge b4 is connected to network segment L8. Each network segment L1–L8 comprises one or more interconnected hosts computers h1–h17. The network segment L1 includes hosts h1, h2 and h3, the network segment L2 includes the host h4, the network segment L3 includes the hosts h5, h6 and h7, the network segment L4 includes the host h8, the network segment L5 includes the host h9, the network segment L6 includes the hosts 10 and h11, the network segment L7 includes the hosts h12, h13 and h14 and the network segment L8 includes the hosts h15, h16 and h17. The network segments L1–L8 may be Ethernet LANs, token ring LANs or FDDI LANs, for example.

Figure 2:
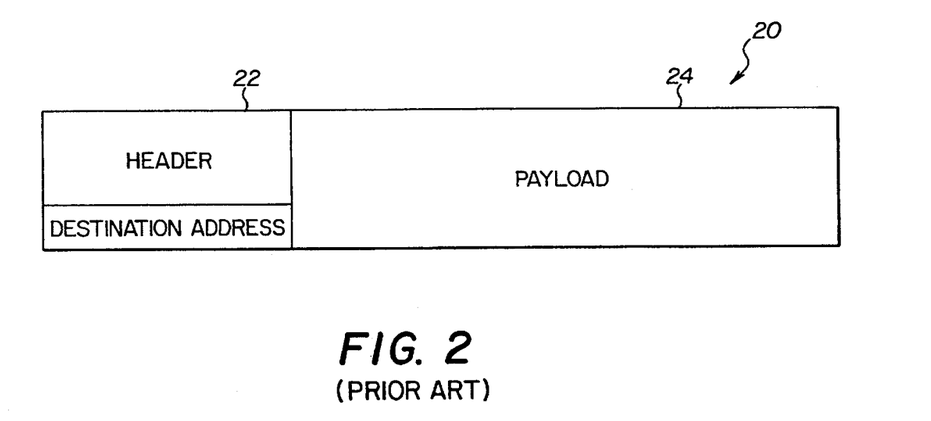
FIG. 2 shows a conventional packet.

Communication may be achieved locally within each network segment L1–L8 according to one of a number of protocols. Since most deployed network segments L1–L8 are Ethernet LANs, the Ethernet protocol for communication is used to illustrate the invention. According to the Ethernet protocol, each host computer is connected via an I/O interface to a common broadcast medium (which broadcast medium may be carried by a coaxial cable, unshielded twisted pairs of wires, etc.). A host communicates on the medium by transmitting a bitstream organized into packets. FIG 2 illustrates an illustrative packet 20, which comprises a header section 22 and a payload section 24. A host which desires to communicate writes data in the payload section 24, and an address of the intended recipient host in the header section 22. (Illustratively, all hosts on a network segment are assigned a unique identifier or address.) If the common broadcast medium is not currently being used, then the host transmits its packet 20 from an I/O interface connected to the host onto the common broadcast medium. If the common broadcast medium is currently being used by another host to transmit a packet, then the host waits until the common broadcast medium is available. The transmitted packet 20 is received at the I/O interface of each other host on the network segment. Each host then examines the destination address written in the header section 22 of the packet 20. If the destination address matches the destination address of the host, the host accepts the packet 20 and may examine the contents of the payload section 24. If the destination address does not match, the host discards the packet 20.

It is possible that two hosts of the same network segment may attempt to transmit a packet concurrently. If this happens, a collision is said to occur. According to the Carrier Sense Multiple Access with Collision Detection (CSMA/CD) protocol, in the event of a collision, each host transmits a jamming signal for a specified period of time and waits a variable amount of time before reattempting transmission of its packet. See U.S. Pat. No. 5,355,375. Collisions are only possible within an individual collision domain or network segment. For instance, the communication amongst the hosts h1–h3 and bridge b1 in the network segment L1 does not effect the communication amongst the host h4 and bridge b1 in the network segment L2. The delay incurred in transmitting a packet on a network segment (as caused by collisions or otherwise) increases with the increase of communications traffic on each segment.

Sometimes it is desirable to communicate from a host in one network segment to a host in another network segment of the same subnetwork. Such communication may be achieved using the bridges b1–b4. The bridge enables inter-segment communication while isolating the two network segments so that they operate as independent collision domains. The bridges b1–b4 also can enable communication between network segments that communicate according to different protocols. For instance, the bridge b1 can enable communication by the host h4 in the network segment L2, which is a Token Ring LAN, with the host h2 in the network segment L1, which is an Ethernet LAN.

The bridges within a subnetwork (e.g., the bridges b1–b2 in the subnetwork A) pass control packets between each other to determine the best route for reaching each host in each attached network segment. Thereafter, each bridge receives each packet transmitted on its attached network segments. If the bridge (e.g., bridge b1) receives a packet from one network segment (e.g., L1) containing a destination address of a host in another network segment, (e.g., the host h8 in network segment L4) the bridge transmits the packet in another attached network segment on a route to the network segment that contains the destination host. For instance, the route from host h 1 in network segment L1 to the host h8 in the network segment L4 illustratively comprises: h1→L1→b1→L2→b2→L4→h8. Thus, the bridge b1 retransmits a packet received from host h 1 destined to host h8 on network segment L2.

In addition to enabling inter-segment communication within a subnetwork, the bridges enable the hosts in one subnetwork to communicate with the hosts in other subnetworks. To that end, IP (internet protocol) addresses may be assigned to each host which includes the destination host's address in the particular subnetwork concatenated to at least a unique address that is assigned to the subnetwork in which the destination host is located. As an example, suppose the host h1 in the subnetwork A wishes to transmit a packet to the host h15 in the subnetwork C. The host h1 writes the IP address of the node h15 (which includes at least the destination address of the subnetwork C concatenated to the destination address of the host h15) in a packet and transmits the packet on its network segment L1. The packet is received at, amongst other places, the bridge b1. If a bridge (e.g., the bridge b1) in a particular subnetwork receives a packet with a destination address that is foreign to the particular subnetwork, the bridge transmits the packet to its attached router (e.g., r2). The packet is then transmitted via the backbone network to the router that connects to the subnetwork containing the destination host. For instance, the packet may be transmitted from the router r2 via the backbone network to the router r4. To that end, each router which receives a packet illustratively uses the destination address (or a portion thereof) to index a routing table stored at the router. The indexed router table entry indicates the next router to which the packet must be transmitted. When the packet reaches the router (e.g., router r4) that attaches the subnetwork (e.g., subnetwork C) containing the destination host (e.g., host h15), the router transfers the packet to the attached bridge (e.g., b4). The bridge then transmits the packet to the destination host.

The discussion above has been limited to unicast packet communication wherein a packet is transmitted from a single source host to a single destination host. The network 10 also supports multicast communication, wherein a packet is transmitted from a single source host to multiple hosts. U.S. Pat. No. 5,331,637 describes multicast routing and, in particular, how to implement multicast routing at the WAN level of the hierarchy. Illustratively, multicast communication of packets is supported in the communications network 10 at the network level of communications according to the Internet Group Management Protocol (IGMP), IETF RFC 112, *Host Extensions for IP Multicasting*. According to this protocol, multicast groups of hosts are identified, wherein each group is a collection of destination hosts for packets for a particular communication. Each multicast group is assigned a special multicast address which bears no relation to any single host of the multicast group.

Each router which connects a campus network 15 to the WAN (e.g., the router r1) periodically transmits a "Host Membership Query" multicast control packet with a destination address that specifies all of the hosts of the campus network 15. In response, each host transmits back to the router (e.g., the router r1) a "Host Membership Report" multicast control packet that indicates all of the groups to which the host belongs. Furthermore, a host can transmit a "Join Host Group" or "Leave Host Group" multicast control packet to the router (e.g., the router r1) at any time to join or leave a multicast group. The router receives these messages and updates its routing tables accordingly.

When a host, e.g., the host h 1, desires to transmit a multicast packet, it writes a multicast address of an appropriate multicast group in the destination field. The host then transmits the packet to its attached bridge, e.g., the bridge b1 (via the subnetwork L1). The bridge has no way of knowing the location of the destination host (because the multicast destination address bears no relationship to the destination address of a single host). Thus, the bridge retransmits the multicast packet to each attached subnetwork and router, other than the subnetwork or router from which the packet originated, e.g., the subnetworks L2, L3 and the router r2. The attached router, e.g., the router r2, accesses its routing table using the multicast destination address. However, unlike before, the accessed routing table entry may indicate more than one next router to which the packet must be transmitted, e.g., the router r1 and the router r3. The router transmits a copy of the packet to each indicated next router. Thus, the packet is selectively routed and replicated in route. Each router that receives a copy of the multicast packet performs the same table access procedure. Eventually, a router, e.g., the router r4, receives a packet that must be transmitted to an attached subnetwork, e.g., the subnetwork C.

When a multicast packet is received at a bridge of the subnetwork, e.g., the bridge b4 of the subnetwork C, the bridge has no way of knowing to which attached network segment (or router) the packet is destined. This is because the packet has a multicast address which bears no relationship to any individual host. Furthermore, the multicast packet can be destined to more than one host in more than one attached network segment and or router. Thus, the bridge retransmits the multicast packet in each attached network segment and to each attached router. The packets transmitted in the network segments are received by each host. Each host then compares the multicast destination address to the multicast destination addresses of the groups of which it is a member. If the host is a member of the same group as indicated in the packet, the host receives the packet. Otherwise, the host discards the packet.

The problem with the above-noted multicast communication scheme is that it wastes bandwidth in the subnetworks. In particular, a bridge retransmits a received multicast packet in each attached network segment even if one of the attached network segments is devoid of destination hosts of the multicast packet (i.e., even if the network segment does not have any hosts that are members of the multicast group of the multicast packet). This results in unnecessary bandwidth reduction in some attached network segments that are devoid of destination hosts. Considering that much multicast traffic in the future is intended to be bandwidth intensive multimedia traffic, i.e., video and/or audio, the wasted bandwidth can be very high and can noticeably degrade performance on a network segment. In the past, the solution to improving network segment performance is to reconfigure the campus network by increasing the number of routers and redistributing (i.e., reconnecting) the network segments or hosts amongst the routers. However, this solution is disadvantageous because routers are relatively expensive and difficult to manage.

S. Deering, *Multicast Routing in Internetworks and Extended LANs*, ACM SYMPOSIUM ON COMMUNICATION ARCHITECTURES AND PROTOCOLS, ACM SIGCOMM pp.55–64, Aug. 1988 proposes an alternative solution. According to the Deering reference, bridges only retransmit multicast packets over "links" on routes to destination host of the multicast packets (wherein a "link" is a communication connection). To that end, each bridge constructs a multicast forwarding table which is maintained at the bridge. The bridge accesses the multicast forwarding table using the multicast group as an address to determine onto which links a received multicast packet must be retransmitted. The Deering reference teaches that the hosts transmit special control packets that are destined to all bridges of the campus network indicating to which multicast group the host belongs. The bridges compile such information, in order to construct the multicast forwarding table and to determine when entries of the multicast forwarding table have become stale and therefore must be discarded.

There are two problems with the proposed Deering solution. First, extra control packets must be transmitted between the hosts and the bridges in order to construct the multicast forwarding tables. This increases traffic on the network segments. Second, and more importantly, all hosts are specially adapted in accordance with the Deering scheme so that they periodically transmit the special multicast control packets in order to maintain their memberships. The solution is therefore not entirely "plug-and-play" from the perspective of the hosts.

It is therefore an object of the present invention to overcome the disadvantages of the prior art. It is a particular object of the present invention to prevent multicast communication traffic that originates from, or is destined to, outside of a subnetwork from degrading the communication performance within the subnetwork.

SUMMARY OF THE INVENTION

These and other objects are achieved by the present invention. The environment of the present invention is a hierarchically organized communications network. The illustrative communications network environment of the present invention is a subnetwork of a campus network which campus network provides for inter-subnetwork unicast and multicast packet communication. The subnetwork includes an internet working device, such as a bridge, for connecting the subnetwork to the campus network.

According to one embodiment, a bridge internet working device constructs a multicast forwarding table (for retransmitting multicast packets) as follows. Selected hosts transmit, on a route to one or more routers, a host membership packet indicating at least one multicast group to which the hosts belong. (for instance, according to IGMP, the hosts may transmit Join Host Group, Leave Host Group or Host Membership Report packets.) A bridge on the route to a router receives each host membership packet. Using the host membership packet, the bridge updates multicast forwarding table entries corresponding to one or more multicast groups of the host which transmitted the packet. In this fashion, the bridge ensures that the multicast forwarding table entries corresponding to each multicast group only indicate those network segments on routes to hosts that are members of the corresponding multicast groups. The bridge then routes the host membership packet to the router in the normal fashion, i.e., retransmits the host membership packet on the route to the router. (The router in turn uses the membership packet to update routing tables thereat.) The bridge then retransmits multicast message packets received thereat, which are destined to the multicast groups joined by the hosts according to the multicast forwarding table maintained at the bridge. Thus, in accordance with the present invention, a bridge utilizes host membership packets normally destined to a router for purposes of maintaining a multicast table. This is a very efficient way to maintain a multicast routing table with a bridge.

This provides a robust solution for preventing multicast packets from flooding all attached network segments without requiring that the individual hosts be adapted in any special fashion.

Multicast message packets are received in a subnetwork at the internetworking device (bridge). The multicast message packet may have originated from outside the subnetwork or from a host within the subnetwork. In any event, the internetworking device retransmits the packet to only those network segments of the subnetwork on a route to a destination host for the received multicast message packets.

In the simplest case of a route, the destination host is contained in a network segment that is directly connected to the internetworking device. In such a case, the route to the destination host may include only the network segment containing the host. In a more complex case of a route, the destination host is contained in a network segment that is not directly connected to the internetworking device. Rather, the network segment containing the destination host is connected to a second internetworking device. The second internetworking device, in turn, is connected via an intervening network segment to the internetworking device which received the multicast packet. In such a case, the route to the destination host includes the intervening network segment, the second internetworking device and the network segment containing the destination host. In the former case, the internetworking device retransmits the packet in the directly connected network segment containing the destination host while in the latter case the internetworking device retransmits the packet in the intervening network segment.

In short, an apparatus and method are provided for controlling the retransmission of multicast packets within a subnetwork to conserve bandwidth. Thus, multicast packets originating from, or destined to, outside the subnetwork do not interfere with the network segments that do not contain any hosts that belong to the multicast group of the multicast packets.

DETAILED DESCRIPTION OF THE INVENTION

Figure 3:
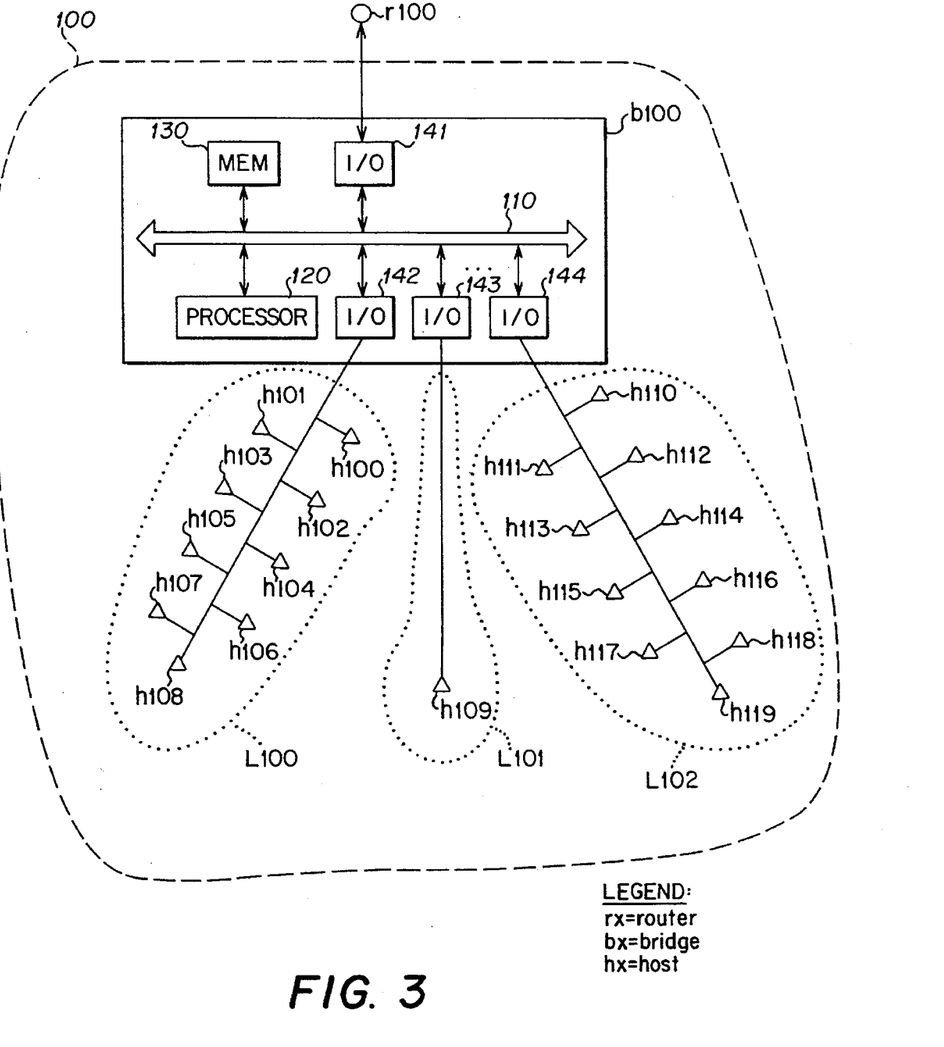
FIG. 3 shows a subnetwork including a bridge according to the present invention.

FIG. 3 shows a subnetwork 100 according to the present invention. As shown, the subnetwork 100 is connected to a router r100 of a campus network or directly to a WAN. The subnetwork 100 includes a bridge b 100 connected to three network segments, namely, L100, L101 and L102. The network segment L100 includes a number of hosts h100, h101, h102, h103, h104, h105, h106, h107 and h108 interconnected to form a LAN such as an Ethernet LAN. Likewise, the network segment L102 includes a number of hosts h110, h111, h112, h113, h114, h115, h116, h117, h118, h119 connected to form a LAN. The network segment L101 only includes the host 109 which is also connected to form a LAN.

As shown, the bridge b 100 includes a bus 110, a processor 120, a memory 130 and 4 I/O interfaces 141, 142, 143 and 144. However, this is illustrative. An arbitrary number of I/O interfaces may be provided to support each router and network segment attached to the bridge b 100. The I/O interface 141 is connected to the router r100. The I/O interface 142 is connected to the network segment L100. The I/O interface 143 is connected to the network segment L101. The I/O interface 144 is connected to the network segment L102. Each I/O interface 141 - 144 is capable of receiving packets and transmitting packets according to the protocol of the router or network segment to which the I/O interface is attached. For instance, the I/O interface 142 can transmit packets, receive all packets, detect a collision on the network segment L100 and transmit a jamming signal, if necessary, as per the Ethernet and CSMA/CD protocols. Thus, the I/O interfaces 141-144 enable the bridge b100 to receive packets from the router r100 and network segments L100, L101 and L102 and to transmit packets thereto.

Packets which may be received via the I/O interfaces 141-144 may be transferred via the bus 110 to the processor 120 or memory 130. Illustratively, the memory 130 is for, amongst other things, temporarily buffering received packets. The processor 120 can access the packets in the memory 130, for example, to read or write data in the header portions of the packets for purposes of translating a packet from one protocol to another protocol. The processor 120 can also examine the address of the packet header to determine from which I/O interface 141-144 the packet should be retransmitted. By selectively retransmitting unicast packets from only the I/O interfaces 141-144 connected to the network segment (or router) containing the destination host of the packet, the bridge b100 conserves the bandwidth of the other network segments (or routers) which do not contain the destination host of the packet.

According to an embodiment of the present invention, multicast packets received at the bridge b100 (from the router r100 or from a host h100-h119 in an attached network segment L100, L101 or L102) are only retransmitted onto the network segments L100, L101 or L102 that contain destination hosts of the multicast packets. Stated another way, the bridge b 100 refrains from retransmitting multicast packets onto those attached network segments L100, L101 or L102 that are devoid of destination hosts of the multicast packets. To that end, the processor 120 maintains a forwarding table with entries corresponding to multicast addresses. Alternatively, additional forwarding table entries as described below may be added to a forwarding table already maintained by the bridge b100.

Figure 4:
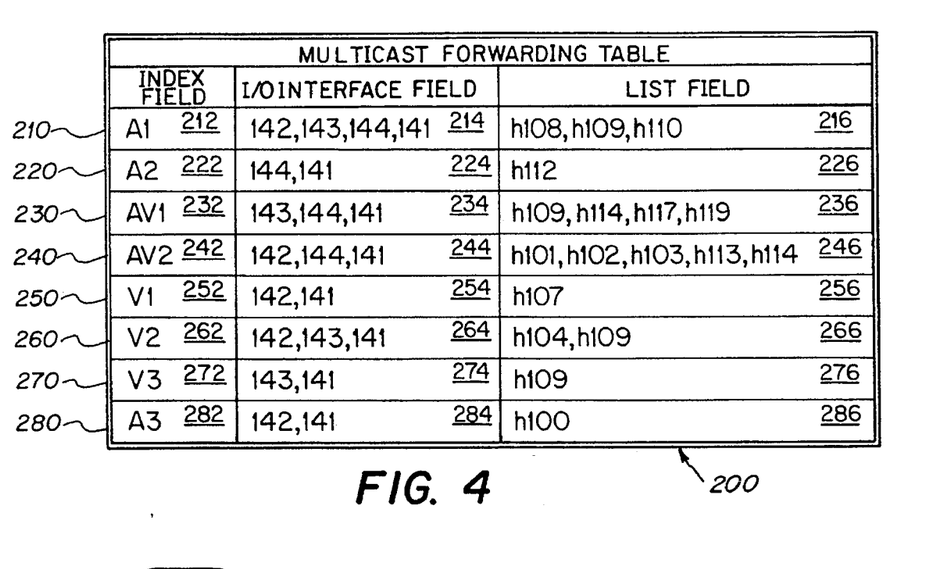
FIG. 4 shows an illustrative forwarding table according to an embodiment of the present invention.

An illustrative forwarding table 200 is shown in FIG. 4. As shown, each table entry 210, 220, 230, 240, 250, 260, 270, and 280 includes a multicast destination address index field 212, 222, 232, 242, 252, 262, 272, or 282. The multicast destination address index field contains a multicast destination address of a particular multicast group. This field is used by the processor 120 for retrieving a multicast forwarding table entry 210–280 that corresponds to a particular multicast group. The table entry also includes an I/O interface field 214, 224, 234, 244, 254, 264, 274 and 284. This field is for storing indications of only those I/O interfaces 142-144 that connect the bridge b 100 to a network segment that contains a destination host of the multicast address. This field 214-284 also stores indications of I/O interfaces 141 that connect the bridge b 100 to a router r100 that provides communication access external to the network segment 100. Furthermore, each table entry 210-280 includes a list field 216, 226, 236, 246, 256, 266, 276 or 286 for storing a list of the hosts which are members of the multicast group corresponding to the table entry. For example, the multicast forwarding table entry 230 corresponds to the multicast group for an audio-video teleconference which has the address AV1 stored in the multicast destination address index field 232. The multicast forwarding table entry 230 also includes the indications of the I/O interfaces 143, 144 and 141 (from which the packets must be retransmitted) stored in the I/O interface field 234. Furthermore, the multicast forwarding table entry 230 includes a list of the hosts h109, h114, h117 and h119 which are members of the multicast group AV1 stored in the host list field 236.

Figure 5:
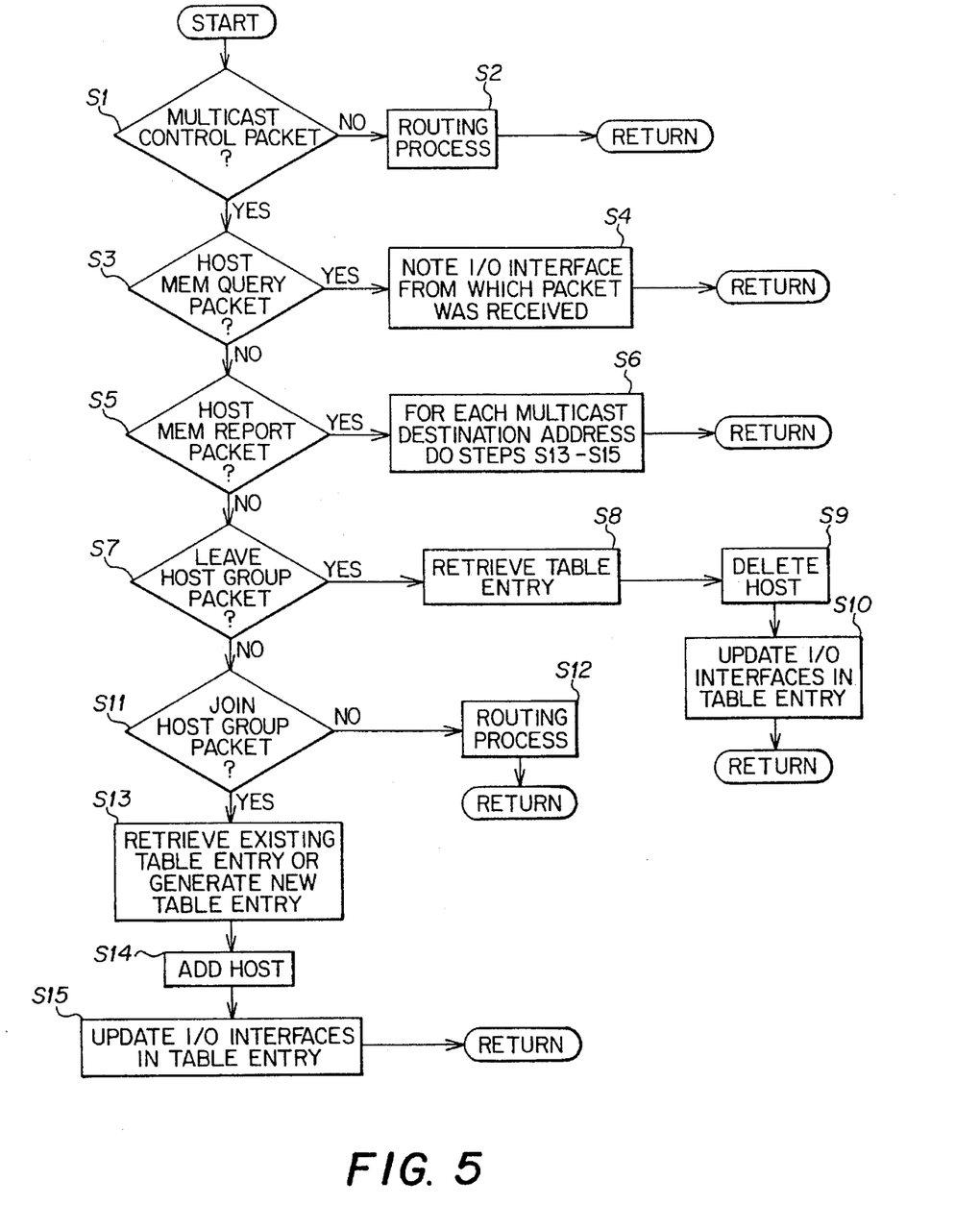
FIG. 5 is a flowchart which schematically illustrates a multicast forwarding table maintenance process according to an embodiment of the present invention.

FIG. 5 is a flowchart that illustrates a process executed by the bridge b100 in constructing and modifying the multicast forwarding table entries 210–280 of FIG. 4. In a first step S1, the processor 120 determines if a received packet is a multicast control packet. Examples of such packets according to the IGMP protocol are Host Membership Query packets, Host Membership Report packets, Join Host Group packets and Leave Host Group packets. Such packets have a well defined and easily identifiable form. If the received packet is not a multicast control packet, the processor executes a routing process (step S2) described below. If the received packet is a multicast control packet, the processor 120 executes step S3. In step S3, the processor 120 determines if the packet contains an instruction from the attached router to each host h101-h119 to report all of its current multicast group memberships (e.g., a Host Membership Query packet). If so, then the processor 120 keeps track of from which router and via which I/O interface 141-144 the packet was received, e.g., by temporarily storing this information in the memory 130. As discussed in greater detail below, the processor 120 uses such information in the construction of forwarding table entries corresponding to multicast groups. In particular, such information is used to update the forwarding tables to ensure that multicast packets originating in the subnetwork 100, and destined outside the subnetwork 100, are transmitted from the bridge b100 to the router r100 that can deliver multicast packets to such destinations external to the subnetwork 100. If the packet is not a Host Membership Query packet, the processor 120 proceeds to step S5. In step S5, the processor determines if the packet contains a report from a host of all of its current multicast group memberships (e.g., a Host Membership Report packet). Such a packet contains the multicast destination address of each multicast group of which the host wishes to be a member. If a Host Membership Report packet is received, then, in accordance with step S6, the processor 120 executes steps S13–S15 for each multicast destination address (of each multicast group) specified in the packet. If the packet is not a Host Membership Report packet then the processor 120 proceeds to step S7.

In step S7, the processor 120 determines if the packet contains an indication that a host is leaving a multicast group (e.g., is a Leave Host Group packet). If not, the processor 120 executes step S11. If the packet does contain an indication that the host is leaving a multicast group, the processor 120 executes steps S8–S10. In step S8, the processor 120 retrieves the multicast forwarding table entry corresponding to the destination address of the multicast group designated in the received packet. For example, suppose the packet contained an indication that host h109 desired to leave the multicast group AV1. The processor 120 would thus retrieve from the memory 130 the forwarding table entry 230 that has the multicast destination address AV1 stored in the multicast destination address index field 232. Next, in step S9, the processor 120 deletes the indication of the host which transmitted the packet from the list of hosts contained in the entry. For instance, the processor 120 would delete the indication for h 109 from the host list field 236 of the multicast forwarding table entry 230. Thereafter, the processor 120 executes step S101, wherein the processor 120 updates the indicators stored in the I/O interface field 234 of the I/O interfaces from which the packet must be transmitted. In particular, the processor 120 examines each remaining host indication contained in the host list field 236. If necessary, the processor 120 deletes an indicator for an I/O interface from the I/O interface field 234 if none of the remaining hosts in the host list are connected via that I/O interface. Such would be the case if the host which transmitted the multicast control packet was formerly the only host on a particular network segment that belonged to that multicast group. Continuing with the above example, the host h 109 was formerly the only host of the list 236 connected to the bridge b100 by the I/O interface 143. Thus, the indication for the I/O interface 143 is deleted from the I/O interface field 234.

In step S11, the processor 120 determines if the received packet contains an indication that a host wishes to join a particular multicast group (e.g., a Join Host Group packet). If not, then the packet must be some unidentifiable multicast control packet. In such a case, in step S12, the processor executes the routing process described below. If a multicast control packet for joining a multicast group was received, the processor 120 executes steps S13–S15. In step S13, the processor 120 first attempts to retrieve a multicast forwarding table entry using, as an index, the multicast forwarding address of the group that the host wishes to join. If the processor 120 is able to retrieve a corresponding multicast forwarding table entry from the memory 130, the processor 120 then executes step S14.

However, it is possible that the host which transmitted the packet wishes to join a multicast group for which no multicast forwarding table entry exists at the bridge b100. Such is the case if the multicast forwarding table was recently flushed or if this host is the first host in the subnetwork 100 (FIG. 3) to join this particular multicast group. If no multicast forwarding table entry exists for the multicast group, then the processor 120 generates one in the memory 130. In so doing, the processor 120 writes the multicast destination address for the group in the multicast destination address index field. The processor 120 also writes the indication of the I/O interfaces 141–144 connected to one or more routers, i.e., the interface 141, that can deliver multicast traffic to destinations external to the subnetwork 100, in the I/O interface field. This is so the bridge b 100 will retransmit multicast packets that are locally generated in the subnetwork 100 to other subnetworks via the router r100. As noted above, the processor 120 can determine which I/O interfaces 141 are connected to such routers r100 in response to receiving Host Membership Query Packets (steps S3–S4). The processor 120 can thus use the previously stored indication of the host interface 141 of the router r100 which issues such multicast query packets to construct the table entry. The processor 120 then executes step S14.

In step S14, the processor 120 adds the destination address of the host which transmitted the control packet to the host list field of the multicast forwarding table entry. Next, in step S15, the processor 120 updates the I/O interface indications in the I/O interface field of the multicast forwarding table entry in accordance with the revised host list. That is, suppose the newly added host is connected to the bridge b100 via an I/O interface not already indicated in the I/O interface field. Such would be the case if the newly added host is the only multicast group member on a particular network segment. If such is the case, then an indicator for the I/O interface which connects the network segment of the newly added host must be added to the I/O interface field of the table entry.

After each of the steps S4, S6, S10 and S15, the bridge also routes the received packet towards its intended destination. In the case of step S4, the multicast packet contains an "all hosts" address. This packet is thus retransmitted on every network segment on a route to a host of the subnetwork 100. In the cases of steps S6, S10 and S15, such multicast control packets are destined to an attached router, such as the router r100. The bridge b 100 retransmits such packets on a route to that router. The router in turn updates its internal routing tables in response to receiving such packets in a well known manner.

In any event, it should be noted that the hosts need not transmit special packets to the bridges. Rather, the bridges b 100 according to the present invention "eavesdrop" on the very same packets used to change host membership on the WAN or campus network level according to, for instance, IGMP protocol. Thus, network segment bandwidth is conserved since a single multicast control packet serves two purposes. Moreover, neither the hosts nor routers need be specially adapted to implement the invention. Rather, only the bridges need be adapted.

While not shown in FIGs, the processor 120 also performs an "aging-out" process. Generally speaking, the forwarding table 200 is only accurate for a limited period of time. This is because of various reasons such as the turning on and off of hosts, the reconfiguration (the changing of the interconnection of routers, bridges and hosts) of the network 100, the failing of a router, bridge, etc. Thus, the forwarding table 100 is presumed to be stale or inaccurate after a fixed period of time, e.g., every five minutes. At each such regular interval, the processor 120 flushes or discards the forward table 200 in the memory 130 and begins constructing a new forwarding table 200 as per the above-described process. See S. Deering, *Multicast Routing in Internetworks and Extended LANs*, A CM Symposium On Communication Architectures and Protocols, ACM SIGCOMM pp. 55–64, Aug., 1988 for an exemplary "aging-out" process.

Figure 6:
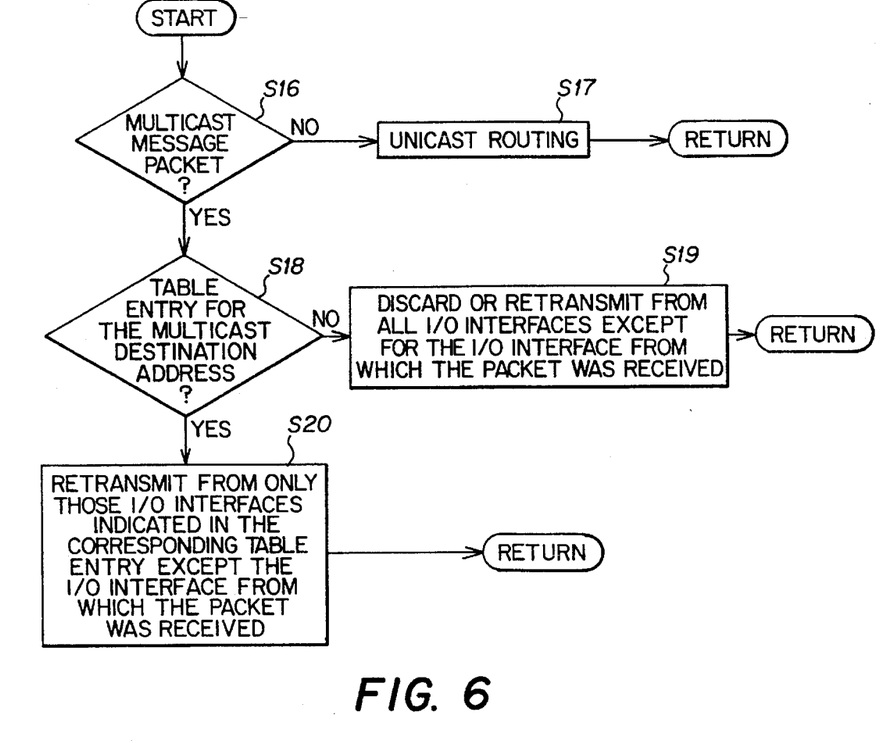
FIG. 6 is a flowchart which schematically illustrates a multicast message packet routing process according to an embodiment of the present invention.

FIG. 6 shows a process executed by the bridge b100 in routing, i.e., retransmitting received packets. In step S16, the processor 120 examines the received packet in the memory to determine if it is a multicast message packet (i.e., a packet for delivering data to multiple destinations). If not, the processor 120 executes step S17 wherein the processor routes the packet using conventional unicast routing (described above). If the packet is a multicast message packet, the processor 120 executes step S18. In step S18, the processor 120 uses the multicast destination address as an index to retrieve a corresponding entry from the multicast forwarding table 200 (FIG. 4). If the table does not have an entry corresponding to the multicast destination address of the received packet then the processor 120 executes step S19. This may occur for various reasons including:

(a) a multicast message packet was received destined to a multicast group not known by the bridge b100, (b) the processor 120 aged out the forwarding table 200, (c) the bridge b100 was recently installed and has not yet determined all of the multicast groups, (d) the bridge b 100 did not receive all of the multicast control packets, and (e) the memory 130 ran out of storage locations and therefore could not complete the forwarding table 200.

In step 19, the processor 120 discards or retransmits the received packets depending on why the multicast destinating group is not contained in the forwarding table 200. For example, in the event of conditions (a)–(b), the received packet is discarded. On the other hand, in the event of conditions (c)–(e) the processor 120 retransmits the received packet in a conventional fashion, namely, the processor 120 retransmits the received packet from each I/O interface 142–144 other than the I/O interface 141 from which the packet was received.

If, on the other hand, the multicast forwarding table has an entry corresponding to the multicast address of the packet, the processor 120 executes step S20. In step S20, the processor 120 retrieves the indications of the I/O interfaces stored in the I/O interface field of the retrieved multicast forwarding table entry. The processor 120 then retransmits the received multicast packet only from the I/O interfaces 141–144 indicated in the I/O interface field except for the I/O interface from which the packet was received. For example, suppose the bridge b100 receives a multicast packet from the router r100 destined to the multicast group V1. This packet is received via I/O interface 141 and temporarily stored in the memory 130. Using V1 as an index, the processor 120 retrieves the table entry 250 corresponding to the multicast group of the address V1. The processor then retrieves all of the I/O interface indications from the I/O interface field 254. The only indicated I/O interfaces are 141 and 142. However, the packet was received from I/O interface 141. Thus, the received multicast packet is only retransmitted from the I/O interface 142. As such, the received multicast packet is retransmitted on the attached segment L100 but not on the attached network segments L101 or L102.

Consider now a second example, where the host h101 wishes to transmit a multicast message packet to the multicast group AV2. The host h101 writes the multicast destination address AV2 into the packet header and transmits the multicast message packet in the network segment L100. This packet is received at hosts h102–h103 which accept the packet. The packet is also received at the I/O interface 142 of the bridge b100. The received packet is temporarily stored in the memory 130. The processor 120 retrieves the multicast forwarding table entry 240. The indicated I/O interfaces are 142, 144, and 141. However, because the packet was received from I/O interface 142, the processor 130 only retransmits the packet from I/O interfaces 144 and 141. Thus, the packet is transmitted to the router r100 (from which the packet may be transmitted to a host external to the subnetwork 100) and to the hosts h113, h114 via the network segment L102. However, the packet is not retransmitted on the network segment L101.

Note the improvement over the conventional multicast routing system wherein a conventional bridge simply retransmits all received multicast packets over each network segment (other than the network segment from which the packet was received). In contrast, according to the present invention, the received multicast packets are retransmitted from the bridge onto only those network segments containing hosts that are members of the pertinent multicast group. This is especially important in the context of multimedia, i.e., audio-video multicast packet communication traffic. Such traffic tends to be continuous rather than bursty and tends to require a high bandwidth.

The invention has been described so far with reference to only a single internetworking device (e.g., bridge) subnetwork. However, the invention is also equally applicable to a multiple internetworking device (e.g., multi-bridge) subnetwork.

In such a case, it is possible that some network segments are not directly connected to all of the bridges. For instance, consider the topology of the subnetwork A of FIG. 1. As shown, the network segment L1 is directly connected to bridge b1 but not to bridge b2. Likewise, the network segments L3 and L4 are directly connected to the bridge b2 but not the bridge b 1. As noted above, the bridges b1 and b2 self-configure routes to the hosts of subnetworks to which they are not directly attached by passing control packets back and forth to each other. For instance, the bridge b1 may determine that packets destined to hosts in the subnetworks L3 and L4 may be transmitted thereto via the intervening network segment L2 and the bridge b2.

Thus, in the multiple internetworking device topology, consideration must be made for routing to multicast destination hosts via intervening subnetworks. This can be achieved by modifying steps S 10 and S15. In particular, when the processor 120 updates the I/O interface field, the processor 120 ensures that only I/O interfaces that attach network segments on a route to a host of the host list are included therein. Such I/O interfaces include those that attach network segments which contain multicast destination hosts and those which attach intervening network segments on a route to multicast destination hosts.

In short, a system and method are disclosed for routing multicast packets in a subnetwork so as to conserve bandwidth in at least some of the network segments or collision domains of the subnetwork. In particular, multicast packets are only retransmitted in the network segments that are on a path to a host that is a member of the multicast group of hosts to which the multicast packet is destined.

Finally, the invention has been described above with reference to illustrative embodiments. Numerous alternative embodiments may be devised by those having ordinary skill in the art without departing from the spirit and scope of the following claims.

The claimed invention is:

1. In a hierarchical communications network comprising:

a plurality of interconnected routers and a plurality of subnetworks connected to said routers, wherein each of said subnetworks comprises:
  one or more network segments, and
  one or more bridges interconnecting said network segments and connecting each said subnetwork to one or more of said routers, and wherein each network segment comprises one or more hosts, a process for providing multicast communication comprising the steps of:

transmitting from a selected one of said hosts on a route to a destination one of said routers a multicast control packet indicating a multicast group to which said host belongs, receiving said multicast control packet at a bridge on said route to said destination router, using said multicast control packet, updating a multicast forwarding table entry in a multicast forwarding table corresponding to said multicast group at said bridge, retransmitting said multicast control packet from said bridge on said route to said destination router, using said multicast control packet, updating a routing table at said destination router, and at said bridge, retransmitting multicast message packets destined to said indicated multicast group according to said updated multicast forwarding table maintained at said bridge.

2. The process of claim 1, further comprising the step of:

in response to receiving the multicast control packet, updating said multicast forwarding table entry corresponding to said indicated multicast group to indicate a network segment of said host from which said multicast control packet was received.

3. The process of claim 2, further comprising the step of:

in response to receiving the multicast control packet, updating said multicast forwarding table entry corresponding to said particular multicast group by adding a network segment of said host from which said multicast control packet was received.

4. The process of claim 2, further comprising the step of:

in response to receiving the multicast control packet, updating said multicast forwarding table entry corresponding to said particular multicast group by removing an indication of a network segment of said host from which said multicast control packet was received, when said host was formerly the only host contained in said network segment that was also a member of said particular multicast group.

5. The process of claim 1, further comprising the steps of:

receiving a multicast message packet at said bridge via one of a plurality of I/O interfaces of said bridge, using a destination address of the received multicast message packet as an index, retrieving a corresponding entry from said multicast forwarding table maintained at said bridge, and retransmitting said multicast message packet from each I/O interface associated with the retrieved corresponding entry from said multicast forwarding table, other then said one I/O interface of said plurality of I/O interfaces via which said multicast message packet was received: and when no entry exists for said destination address, retransmitting said received multicast message packet from each I/O interface of said plurality of I/O interfaces except for said one I/O interface via which said multicast message packet was received.

6. The process of claim 1, wherein a route from a particular bridge of a subnetwork to a particular host that is a member of a particular multicast group includes at least one intervening network segment connected directly to said particular bridge, said process comprising the steps of:

receiving at said particular bridge a multicast message packet destined to said particular multicast group, and retransmitting said multicast message packet in said at least one intervening network segment.

7. The process of claim 1, wherein each entry of said multicast forwarding table corresponds to a different multicast group and wherein each table entry indicates only those I/O interfaces connected to network segments on a route to a host that is a member of said corresponding multicast group.

8. A bridge in a hierarchical communications network comprising:

a plurality of I/O interfaces for transmitting packets to, and for receiving packets from, routers and network segments attached to said bridge, said plurality of I/O interfaces including one I/O interface connected to each of said routers and one I/O interface connected to each of said network segments, and a processor connected to said I/O interfaces, for receiving a multicast control packet transmitted from a host of one of said network segments to one destination router of said routers via a route including said bridge, for updating a multicast forwarding table entry in a multicast forwarding table in said bridge corresponding to a multicast group of said multicast control packet, for causing said I/O interface connected to said destination router of said multicast control packet to retransmit said multicast control packet, and for causing said I/O interfaces to retransmit multicast message packets destined to said multicast group according to said multicast forwarding table.

9. The bridge of claim 8, further comprising:

a bus interconnecting said I/O interfaces and said processor, and a memory connected to said bus for storing said multicast forwarding table.

10. A network bridge, comprising:

at least two I/O interfaces to each receive and transmit data packets; and a processor operatively coupled to the at least two I/O interfaces;

wherein the processor comprises:

means for receiving any data packet received by any of the at least two I/O interfaces;

means for identifying the received data packet as a multicast control packet destined for a device other than the network bridge;

means for identifying the I/O interface on which the identified multicast control packet arrived;

means for identifying a multicast group from the multicast control packet; and means for updating a multicast forwarding table entry associated with the determined multicast group.

11. The network bridge as recited in claim 10, wherein the processor further comprises:

means for determining a source of the identified multicast control packet; and the updating means further comprises:

means for associating the determined source with the determined multicast group and the I/O interface on which the multicast control packet arrived.

12. The network bridge as recited in claim 11, further comprising a memory operatively coupled to the processor for storing the updated multicast forwarding table.

13. The network bridge as recited in claim 10, further comprising:

means for retrieving the multicast forwarding table entry as a function of the determined multicast group;

whereby a multicast message destined for the determined multicast group will be retransmitted according to the multicast forwarding table entry associated with the determined multicast group.

* * * * *

UNITED STATES PATENT AND TRADEMARK OFFICE
CERTIFICATE OF CORRECTION

PATENT NO. : 5,608,726
DATED : March 4, 1997
INVENTOR(S) : Kenneth Virgile

It is certified that error appears in the above-indentified patent and that said Letters Patent is hereby corrected as shown below:

Col. 1 , line 59 -  delete "10" and substitute -- h10 --

Col. 9., line 5 -  delete "S101" and substitute -- S10 --

Signed and Sealed this

Sixteenth Day of September, 1997

Attest:

BRUCE LEHMAN

Attesting Officer

Commissioner of Patents and Trademarks